United States Patent [19]

Knerr et al.

[11] Patent Number: 5,232,030

[45] Date of Patent: Aug. 3, 1993

[54] COOPERATIVE CONVEYOR SYSTEM FOR CANTER AND SAW

[75] Inventors: Michael P. Knerr, Ridgefield; Lloyd R. Booth, Woodland; Glenn E. Teague, Vancouver, all of Wash.

[73] Assignee: U.S. Natural Resources, Inc., Vancouver, Wash.

[21] Appl. No.: 895,732

[22] Filed: Jun. 9, 1992

[51] Int. Cl.⁵ .................... B27B 31/00; B27C 1/12
[52] U.S. Cl. ........................ 144/246 D; 83/371; 144/3 R; 144/39; 144/242 C; 144/246 R; 144/357; 144/369
[58] Field of Search ............... 83/72, 110, 367, 371, 83/404; 144/37, 39, 41, 246 R, 246 D, 246.G, 242 C, 245 R, 3 R, 357, 378, 369; 198/780, 782, 783, 784, 792

[56] References Cited

U.S. PATENT DOCUMENTS

| | | | |
|---|---|---|---|
| 4,316,491 | 2/1982 | Kearnes et al. | 144/39 |
| 4,370,687 | 2/1986 | Dietz | 144/39 |
| 5,109,740 | 5/1992 | Kohn et al. | 83/371 |
| 5,143,127 | 9/1992 | Rautio | 144/39 |

Primary Examiner—W. Donald Bray
Attorney, Agent, or Firm—Robert L. Harrington

[57] ABSTRACT

A cooperative conveyor system for a lumber production line. The production line has a canting station and a sawing station spaced at a distance from each other and interconnected by a powered conveyor system. The cants are fed at a higher rate through the canting station than through the sawing station. The conveyor system is arranged to receive cants from the canting station at a high feed rate and transport the cants to and into a sawing station at a lower feed rate. The cants are fed through the canting station at controlled intervals so that the resulting gap between succeeding cants received on the conveyor are at a desired spacing to maximize the production of the sawing station. The cant exiting from the canting station is forced to overrun the conveyors feed rate and thereby reduces the gap between it and a preceding cant. The conveyor then transports the cant to and into the sawing station at the desired feed rate for the sawing station. In one embodiment, the sawing station has two saws. The conveyor system is arranged to shift the cant exiting the canting station into alignment with the saw selected to perform the sawing operation.

8 Claims, 3 Drawing Sheets

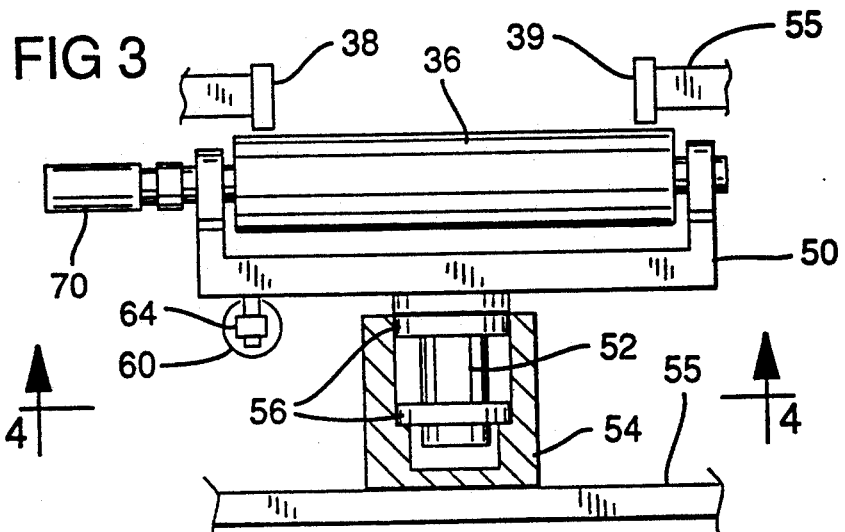
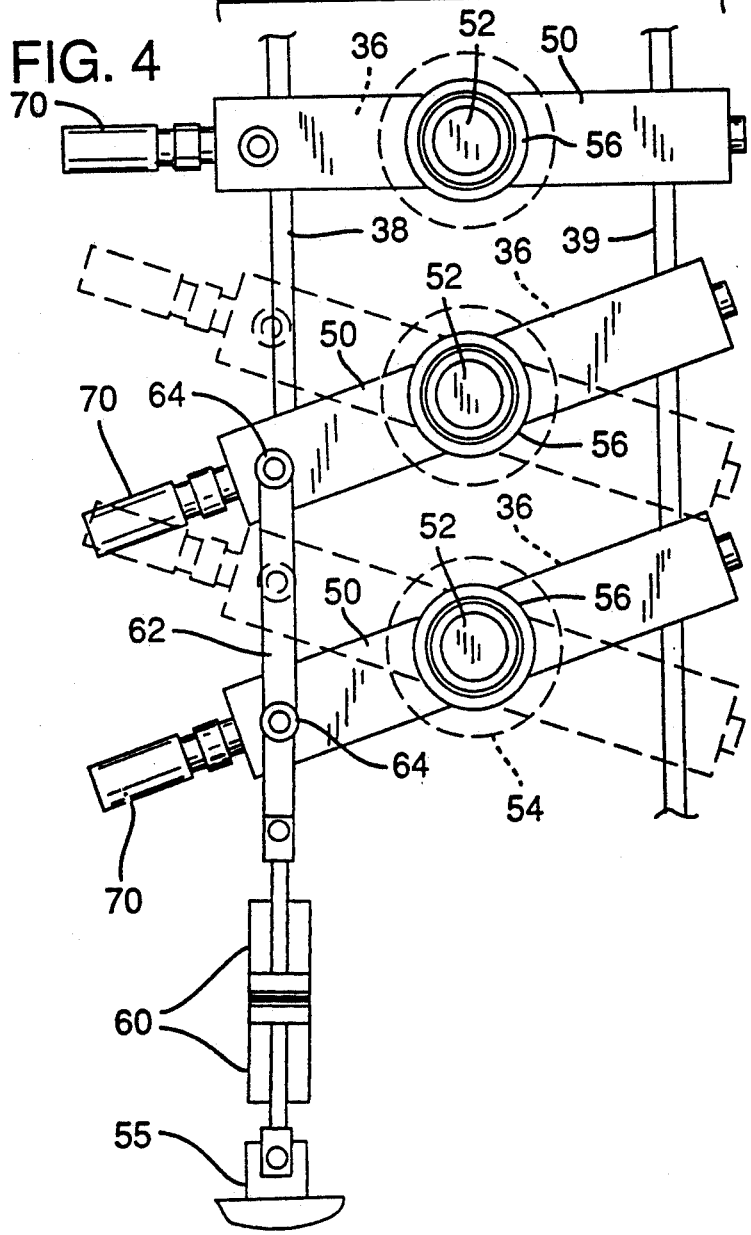

COOPERATIVE CONVEYOR SYSTEM FOR CANTER AND SAW

FIELD OF THE INVENTION

This invention relates to a system of forming cants in a canter, and then boards or flitches, e.g., in a gang saw wherein the canter and gang saw are optimally utilized by the coordination of conveyors that control the feeding of the cants through the canter and into the gang saw.

BACKGROUND OF THE INVENTION

Lumber production requires a series of operations including bucking logs into lengths, debarking the logs, scanning the logs for optimal cutting pattern, canting the logs by squaring up the sides, cutting the canted log into flitches or boards, edging the boards, etc.

Each of the operations has its own peculiarity and one of the objectives and/or challenges of a lumber mill is to coordinate the operations so as to maximize production. The particular operations to which the present invention is directed is the canting and sawing operations.

Canting, as contemplated herein for the preferred embodiment, involves feeding of a two-sided cant (flattened on the top and bottom) through chipping heads located to flatten the opposed sides. The chipping heads are typically rotating disks that each carry specialized knives which generate the opposed flat parallel sides. The cant (now having all four sides flattened), is then sawn into boards. The saws that accomplish this operation are typically multiple saw blades (a gang saw) spaced apart the desired width of the boards that are to be sawn from the cant.

The feeding process for this combination of canting and sawing operations involves (a) placing the two-sided cant at the entry of the canter, (b) setting the chipping disks of the canter to the desired spacing, (c) feeding the cant through the canter and then onto a conveyor, (d) positioning the four-sided cant on the conveyor to align the cant with the gang saw blades, and (e) feeding the canted log through the saw.

Inefficiency in the operation of the canter and saw in part results from the fact that the canter is capable of canting a log at a feed rate (e.g., 400 feet per minute) that is substantially greater than the feed rate that can be tolerated by the saws (e.g., 255 feet per minute). To slow the speed of the canter to match the speed of the saw is an unacceptable solution. Heretofore, sawmills would typically provide one canter for two saws as a way to maximize the production of the canter.

Not considered in the above two-saws-for-one-canter solution is the substantial gap that exists between the cants as they exit the canter. As described above, each log that is to be canted requires a different setting of the chipping disks. The new setting cannot commence until the prior cant has completely passed through the canter. The time required to reset the canter and place a following cant at the entry to the canter results in a spaced feeding of the cants through the canter. The cants exit the canter at spaced intervals, e.g., an end-to-end gap between the cants of 12 feet or more. The saw blade settings remain the same from one cant to the next. Some spacing is required to adjust the feed rollers that control entry into the saws but nothing like the gap required by the canter. A one-foot gap between cants is acceptable for sawing.

The problem of inefficient utilization of the saws is aggravated by having to stop or slow the conveyance of the cants while the cants are being aligned with the saws. Considering this time for alignment in addition to the lengthy gaps between the cants, saws are sawing only about half of the time. Yet the industry has heretofore concluded that it takes two of the saws to accommodate a single canter running at optimum speed.

BRIEF DESCRIPTION OF THE INVENTION

The present invention is directed to an arrangement whereby saw utilization is the primary consideration. The optimum feed rate for feeding cants into a gang saw is first established. Then the minimum gap is established. For example in most sawing operations a one-foot gap between successive cants is considered acceptable for setting the saws feed rollers. Consistent with this objective, interrupting the feed rate by stopping the conveyor to align the cants on the conveyor is to be avoided.

In the preferred embodiment, the contemplated sawing station includes dual gang saws to achieve two different board widths. The conveyor is equipped with a guide rail at each side and the canted log is pushed up against one rail or the other depending on which of the two gang saws is to be used. The invention with respect to this aspect of the problem is accomplished by utilizing driven support rollers which can be selectively angled toward one side or the other. Thus, the cants can be selectively moved against either of the rails without materially slowing the feed rate thereof.

The final step is to establish a desired feed rate for the canter. As the cants exit the canter, they are gripped by driven nip rollers that dictate the rate of conveyance of the canted log for as long as it takes to pass the full log length through the canter. Thus, the leading end of the canted log is moved toward the sawing station at the feed rate of the canter, e.g., 400 feet per minute. By directing the canted logs from the canter directly onto the feed conveyor for the saws, e.g., moving at 255 feet per minute, the logs, for as long as they are controlled by the nip rollers of the canter, are forced along the saw conveyor at the higher speed of the canter. A preceding cant being conveyed only by the saw conveyor is thus being overtaken by the cantercontrolled log to close the gap therebetween.

The longer the cant, the longer the cant is controlled by the nip rollers and the smaller the gap becomes. Thus, a consideration is the maximum length cant to be handled by the system. The facts that thus determine the rate to be established for the canter are (a) the desired feed rate of the saw conveyor, (b) the maximum length of the cants to be canted, (c) the minimum gap produced at the canter station between the longest cants entering the canter, and (d) the desired gap between successive logs entering the saw.

As an example, consider that (a) equals 255 feet per minute, (b) equals 20 feet, (c) equals 13 feet, and (d) equals one foot. At the point that a preceding log is released by the nip rollers of the canter, the succeeding 20 foot log is 13 feet behind the preceding cant. The succeeding 20 foot cant will travel 33 feet before it also is released by the nip rollers. The preceding cant will have traveled 21 feet in that same period of time if the 13 foot gap is to be reduced to one foot. Thus, 21 divided by 255 equals 33 divided by X (the feed rate of the canter) which is approximately 400 feet per minute.

The invention will be more fully appreciated and understood by reference to the following detailed description and drawings.

BRIEF DESCRIPTION OF THE DRAWINGS

FIG. 3 is view of a pivotable roller assembly of the cooperative conveyor system;

FIG. 4 is a bottom view of a plurality of roller assemblies as if viewed on view lines 4—4 of FIG. 3;

DESCRIPTION OF THE PREFERRED EMBODIMENT

Figures 1, 2:
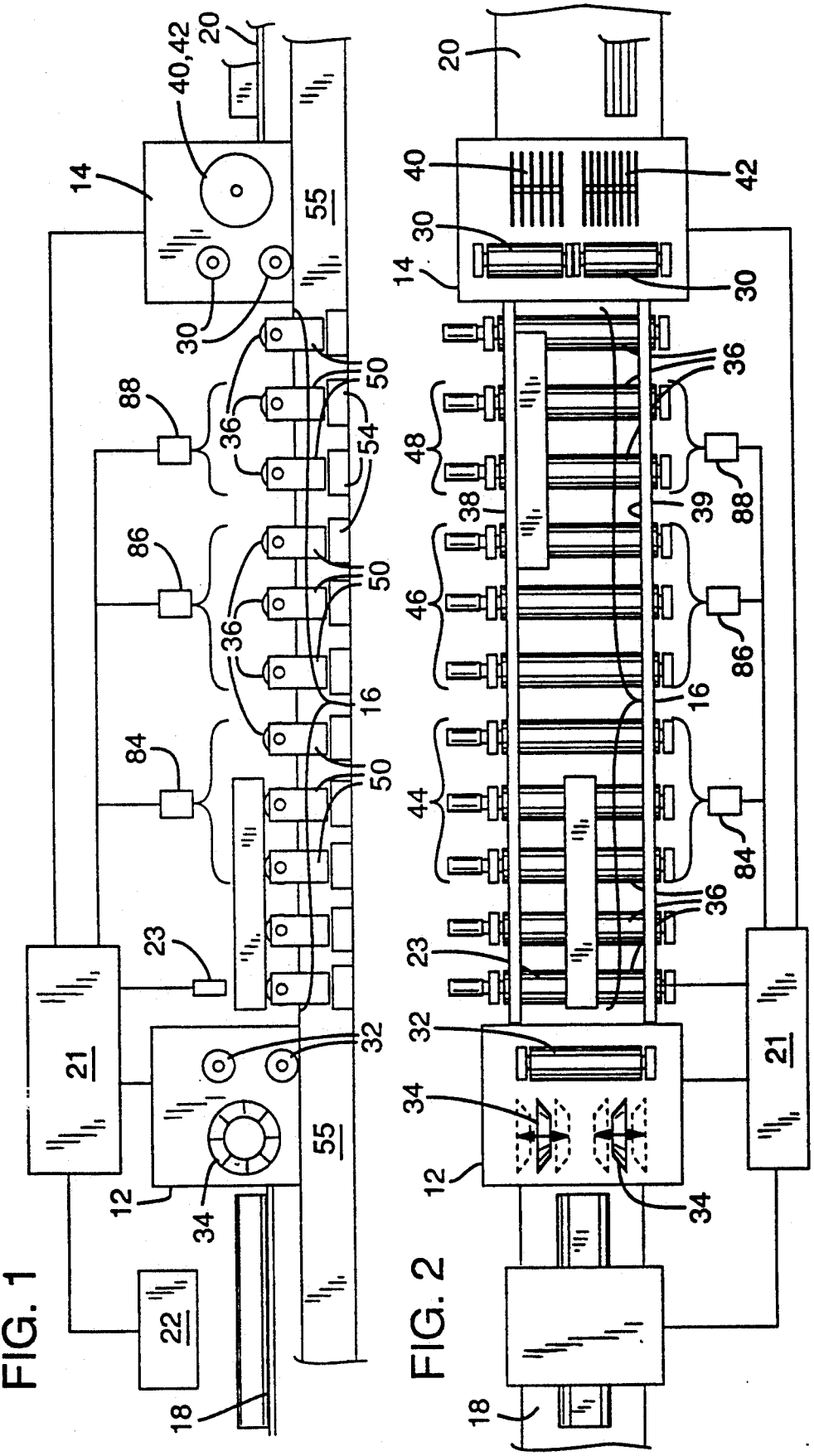
FIG. 1 is a side view of a lumber production line showing the cooperative conveyor system of the present invention.
FIG. 2 is a top view of the production line of FIG. 1.

As shown in FIG. 1, the production line 10 has a canting station 12, and a sawing station 14 spaced at a distance from each other. A powered conveyor 16, preferably of the roller type is provided between the canting station and the sawing station. The conveyor 16 serves as a receiver to receive cants exiting the canting station 12 and a transporter to transport the received cants to and into the sawing station 14. The conveyor 16 includes side rails 38, 39 mounted to the frame 55 (See FIG. 3). The side rails 38, 39 are not shown in FIG. 1 for drawing clarity. The powered conveyor 16 is driven to provide a feed rate equivalent to the feed rate of the saw station 14 which in this embodiment is 255 feet per minute (4.25 ft/sec). An infeed conveyor 18 positively feeds cants into and through the canting station 12. The conveyor 18 includes the press (feed) rolls 32 of the canting station 12 which provide the positive force to feed the cant through the canting station at the feed rate, which in this embodiment is 400 feet per minute (6.67 ft/sec). A discharge table 20 is provided at the exit of the sawing station 14 for receiving the sawed boards exiting the sawing station.

A computer 21 is provided to control and adjust the production line 10. A scanner 22 in the vicinity of the conveyor 18 provides dimensional data for each cant. A sensor 23 located at the exit end of the canting station 12 provides confirmation of the cant position. The computer controls individual controllers for adjusting the skew of the roller sets 44, 46, and 48 of the conveyor 16 which will be explained later. The computer 21 controls the settings of the canting station cutting blades 34, the feed rollers 32 of the canting station and the feed rollers 30 of the saw station 14.

Consider now the sequence of operations. The production line 10 processes log cants into sawed boards (The logs cants have previously been processed through a separate canting operation to form two squared parallel sides). A log cant is scanned by scanners 22 for dimensional data and is positioned on the conveyor 18. The scanned data provides the length, cross section and the height of the log cant. From the cross sectional data, the cutting components of the canting device, such as chipper heads 34, are adjusted to produce the desired width of the cant. The height data provides information for adjusting the press rolls 32 which will feed the cant through the canting station (The height data will also be utilized to adjust the saw station feed rollers 30 just prior to the cant entering the saw station). After the adjustments to the canting station are made, the log cant is fed through the 10 canting station at a rate of 400 feet per minute. The log cant is being forcibly fed at the rate of 400 feet per minute and the cant as it exits the canting station and enters onto the conveyor 16 will be forced to overrun the conveyor 16. As soon as the cant exits the canting station 12 and is no longer under the control of the canting station press rolls 32, the cant will travel on the conveyor 16 at the feed rate of the conveyor (255 fpm) and will be transported to and into the sawing station at the conveyor speed. In this regard, the conveyor 16 must be of sufficient length to receive the longest cant to be processed so that the canting station drive mechanism does not force the cant into the saw station at the higher feed rate. While the first cant is being fed through the canting station 12, a succeeding cant is scanned and positioned on the conveyor 18 and readied to be fed through the canting station.

Since the canting station 12 feeds the cants at a higher feed rate than the conveyor 16 (and saw station 14), i.e., 400 fpm versus 255 fpm, the cants must be fed through the canting station at minimally spaced intervals. This is so that a succeeding cant being fed by the canting station 12 does not overtake the preceding cant that is being fed by either or both the conveyor 16 and saw station 14.

The effective gap length (interval) required between cants being fed through the canting station 12 is dependent on the length of the succeeding cant. Consider a succeeding cant length of 20 feet and that the desired spacing between the cants when both are placed on the conveyor 16 shall not be less than one foot. The first (preceding) cant must be moved a distance of 21 feet from the point it is released by the canting station press rolls 32 to provide space on the conveyor 16 for the succeeding 20 foot cant plus the desired one foot spacing. The time required to move the first cant 21 feet on the conveyor 16 is approximately 4.9 seconds (time equals distance divided by feed rate, i.e., 21 divided by 4.25 equals 4.9). The succeeding cant would be fed a distance of approximately 32.7 feet by the canting station 12 (distance equals feed rate multiplied by time, i.e., 6.67 times 4.9) during the same time interval. The initial required gap length between cants being fed through the canter is thus 12.7 feet (travel distance less the cant length).

The required gap length is calculated on the basis that the succeeding cant is started on its feed path 12.7 feet behind the preceding cant the instant the preceding cant is released by the feed rollers 32 of the canting station 12. However, this spacing is actually a combination of the true spacing and the time delay, i.e., the spacing between the entrance and the exit of the canter plus the time delay in getting the cant to the start up position figured at a rate of 400 fpm. Thus, if the distance between entrance and exit is 6 feet, the required time delay must be 6.7 divided by 400 equal 0.017 minutes or 1.02 seconds. (This 1.02 seconds delay may well be the required time needed to set the chipping discs. Obviously, if the actual spacing (entrance to exit) or required delay for setting the chipping discs in combination exceeds the 12.7 foot spacing, the canter speed may be increased, i.e., $$(CL + 1ft)/SFR = (CL + CS)/CFR$$

where CL is cant length, SFR is saw feed rate, CS is actual cant spacing, and CFR is allowed feed rate of canter.

The cross section of the cant is a determining factor in how the cant should be sawed. For example, one range of cant sizes may be best suited for being sawed into boards of 5/4" width and another range of cant sizes may be best suited for being sawed into boards of 7/4" width. Referring to FIG. 2, the production line 10 has two saws at the sawing station 14. In this embodiment, saw 40 is setup to saw the cants into 7/4" widths and the saw 42 is set up to saw the cants into 5/4" widths. The scan data on each cant input to the computer 21 is used to determine which saw will saw the cant. The cant, once it exits the canting station 12, must be transported and aligned with the saw selected to saw the cant.

The cants exiting from the canting station 12 are positioned centrally on the powered conveyor 16 and move down the center of the conveyor until the cant is free of the press rollers 32 of the canting station 12. As soon as the cant is free of the canting station press rollers 32, the cant is shifted to one side or the other depending on which saw has been selected to saw that cant.

The conveyor 16 has rollers 36 that may be skewed in reference to the length of the conveyor as is best seen in FIGS. 4 and 5A-D. In this embodiment, the rollers are skewed in sets. Reference numeral 44 and 46 indicate two three roll sets and numeral 48 indicates a two roll set.

The mounting arrangement for the rollers is shown in FIG. 3. Each roller is mounted on a support yoke 50. A post 52 extending from the yoke 50 is rotatably mounted in a support column 54 on bearings 56. The support columns 54 are mounted to the frame 55 of the conveyor 16. With reference also to FIG. 4, a motor, such as a cylinder 60, is utilized to skew each roller set 44, 46, and 48 with a cylinder 60 provided for each roller set. The rollers of each set are connected to skew in unison by a connecting bar 62. The connecting bar 62 is pivotally attached to each yoke 50 by a mounting stud 64. An end of the bar 62 is connected to the cylinder 60 in a conventional manner. As shown in FIG. 4, the roller sets may be skewed in each direction in reference to the horizontal length of the conveyor 16. As previously mentioned, the conveyor 16 is a powered conveyor. Each roller of the skewable roller sets are individually driven, preferably by hydraulic motors 70. The roller sets 44, 46, and 48 are controlled to skew by individual controllers. A controller 84 controls the skewing of the roller set 44, controller 86 controls roller set 46 and controller 88 controls roller set 48. The controllers 84, 86 and 88 are operated by the computer 21.

Figure 5A:
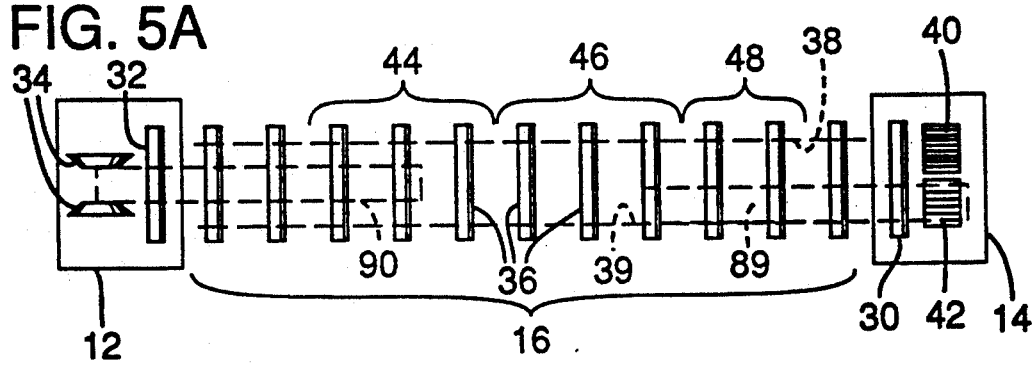
FIGS. 5A-D are diagrammatical views of the production line of FIGS. 1 and 2.
Figure 5B:
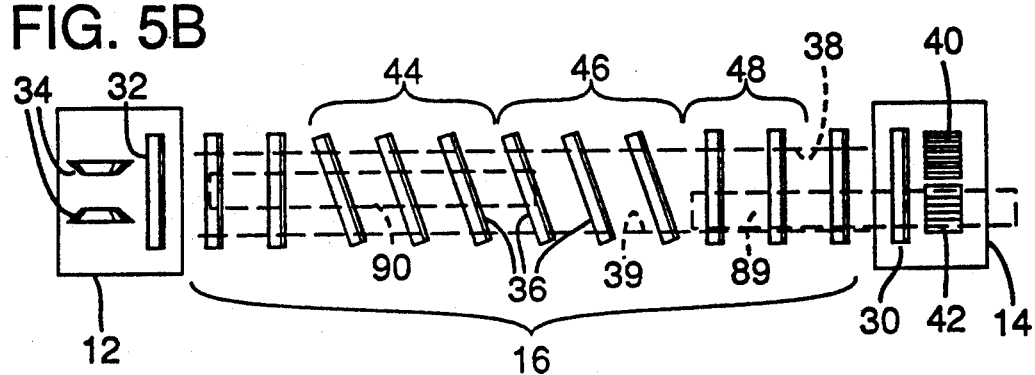
Figure 5C:
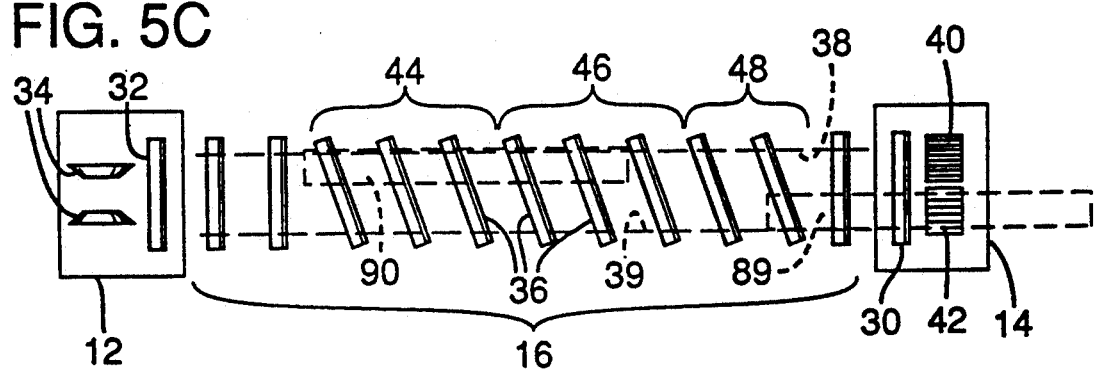
Figure 5D:
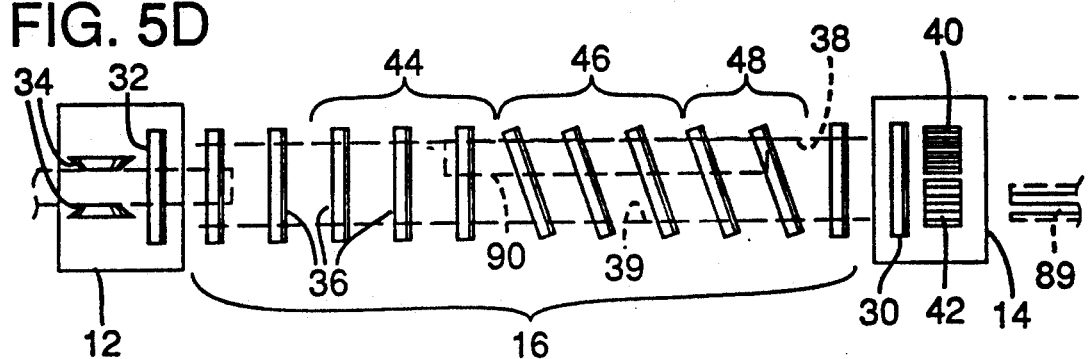

Refer now to FIGS. 5A-D of the drawings which show one example of a cant 90 being fed through the canting station 14 and placed on the conveyor 16 and is subsequently shifted to one side to be aligned with saw 40 of the sawing station 14. In FIG. 5A, the cant 90 is being fed through the canting station 12 and is moving down the center of the conveyor 16. The cant 90 is still under the control of the canting station feed rolls 32 and is therefore being fed onto the conveyor at the feed rate of the canting station 12 and is overrunning the feed rate of the conveyor 16. The gap between the cant 90 and the preceding cant 89 is thus decreasing. In FIG. 5B of the drawings, the cant is free of the feed rolls 32 of the canting station 14 and is now being transported toward the sawing station 14 at the feed rate of the conveyor 16. The length of the cant 90 is known from the scan data and its position is known based on the feed rate of the cant through the canting station 12. A sensor 23 is also provided to confirm the position of the cant 90. As soon as the cant 90 is free of the feed rollers 32 of the canting station 12, the roller set 44 and 46 are skewed so that the cant 90 will be moved toward the side rail 38 mounted to the frame 55 (see FIG. 3) where it will be aligned with the saw 40. Roller set 48 is not skewed until it no longer exerts influence on the preceding cant 89. FIG. 5C shows all of the roller sets 44, 46, and 48 skewed (in the same direction) and the cant 90 is approaching the side rail 38 of the conveyor 16. In FIG. 5D, the roller set 44 has been skewed to its normal position and as the cant 90 comes into contact with the side rail 38 of the conveyor 16 and is aligned with the saw 40, the roller sets 46 and 48 will be skewed back to their normal position as shown in FIG. 5A.

The FIGS. 5A-D show the roller sets skewed to move the cant 90 to one side of the conveyor 16 in alignment with the saw 40. The roller sets 44, 46 and 48 would have been skewed in the opposite direction to move the cant 89 into alignment with saw 42. The arrangement and the individual control capability of each roller set 44, 46 and 48 enables shifting cants of different lengths to one side or the other as required.

The preferred embodiments described and illustrated provide but one example of the invention. It is believed that the invention may be applied to processing stations or apparatus other than canting and sawing stations and that the conveyor will transport and direct other wood items other than cants or log cants. While the preferred embodiment illustrated the cants entering the center of the conveyor, cants or other linear items of wood such as boards, timbers, flitches and the like may enter the conveyor on either side as well as the center. The arrangement of the controlled skewing of the rollers of the conveyor system provides the capability of transporting of the linear items in its received position as well as the capability of shifting the items received on the conveyor to an alternative position such as center to side, side to center and side to side. The shifting ability provides the capability of aligning the linear item(s) with any one of multiple processors or apparatus at a processing station.

Those skilled in the art will recognize that variations and modifications may be made without departing from the true spirit and scope of the invention. The invention is therefore not to be limited to the embodiments described and illustrated but is to be determined from the appended claims.

What is claimed is:

1. In a system for processing logs into lumber wherein linear items produced from the logs are successively processed through at least two processing apparatus and the first processing apparatus generates spacings between the successive linear items when exiting the first apparatus that are undesirable for efficient utilization of the second processing apparatus, a cooperative processing arrangement comprising:
   a first processing apparatus,
   a first conveyor controlling the conveyance of successive linear items into and through the first processing apparatus with the successive logs exiting the first processing apparatus at spaced intervals,
   a second processing apparatus spaced from the first processing apparatus, a second conveyor receiving the successive linear items from the first conveyor and feeding the linear items into the second processing apparatus, said first conveyor and said second conveyor cooperatively arranged with the first conveyor conveying the successive linear items at a linear feed rate higher than the feed rate of the second conveyor whereby successive linear items are controlled by the first conveyor and forced along a portion of the second conveyor to overtake a preceding linear item on the second conveyor and thereby reduce the spacing between successive linear items fed into the second processing apparatus.

2. In a system as defined in claim 1 wherein said second processing apparatus has a desired linear feed rate and is operable at said desired linear feed rate with the successive linear items at a desired minimum spacing therebetween, and said first processing apparatus is operable with the successive linear items exiting the first apparatus at a determined minimum spacing therebetween that is greater than the desired spacing for the second processing apparatus, said first and second processing apparatus cooperatively arranged for processing linear items having a determined maximum length, said first conveyor established to convey the linear items into and through the first processing apparatus so that said determined maximum length linear items overtake preceding linear items and close said minimum length gap to the desired minimum spacing for processing by the second processing apparatus.

3. In a system for processing logs into lumber as defined in claim, 1, wherein:
the first processing apparatus is a canter,
the second processing apparatus is a saw, and
the linear items are cants.

4. A conveyor for conveying linear items being processed into lumber, comprising;
a conveyor frame,
a sequence of rollers rotatably mounted on the frame and forming a conveyor bed, a power source for rotating the rollers to convey the linear items lengthwise toward on end along the conveyor bed, and a processing apparatus positioned at said end for receiving linear items conveyed by said conveyor and the improvement which comprises;
said rollers normally mounted perpendicular to the direction of conveyance, certain of said rollers pivotally mounted on the frame to be pivotally moved to a position angled from the direction of conveyance, and a control connected to said rollers controlling the pivotal movement of said rollers, and a guide rail at one side of the conveyer establishing a reference for alignment of the linear items with the processing apparatus, said angled rollers urging side shifting of said linear items against said guide rails without interrupting the feed rate of the linear items along said conveyor bed.

5. A conveyer as defined in claim 4 including a guide rail on each side of the conveyor, said processing apparatus including a pair of saws, one aligned with each guide rail, said rollers being selectively pivotal between a perpendicular position and at different angles for directing movement of a linear item to either guide rail for sawing by a selected one of the saws.

6. A conveyor as defined in claim 5 wherein said certain rollers are separated into multiple roller units, said roller units arranged in sequence along said conveyor bed, said units being independently pivotal and said control having independent control of the units for sequentially angling said roller units to coordinate the side shift urging thereof selectively as between successive linear items.

7. In a system as defined in claim 1 wherein the second processing apparatus is a sawing station, a saw located at said saw station, said second conveyor including a conveyor frame, a sequence of rollers rotatably mounted on the frame and forming a conveyor bed, a power source for rotating the rollers to convey the linear items lengthwise along the conveyor bed, said rollers normally mounted perpendicular to the direction of conveyance, certain of said rollers pivotally mounted on the frame to be pivotally moved to a position angled from the direction of conveyance, and a control controlling the pivotal movement of said rollers, and a guide rail at one side of the conveyor establishing a reference for alignment of the linear items with the saw of the sawing station, said angled rollers urging side shifting of said linear items against said guide rail without interrupting the feed rate of the linear items along said conveyor bed.

8. In a system as defined in claim 7 including a guide rail on each side of the conveyor, said sawing station including a pair of saws, one aligned with each guide rail, said rollers being relatively pivotal between a perpendicular position and at different angles for directing movement of a linear item to either guide rail for sawing of a linear item by a selected one of the pair of saws.

* * * * *